June 11, 1940.  E. HESS  2,203,908
SAFETY HYDRAULIC BRAKE SYSTEM
Filed Oct. 3, 1935  4 Sheets-Sheet 1
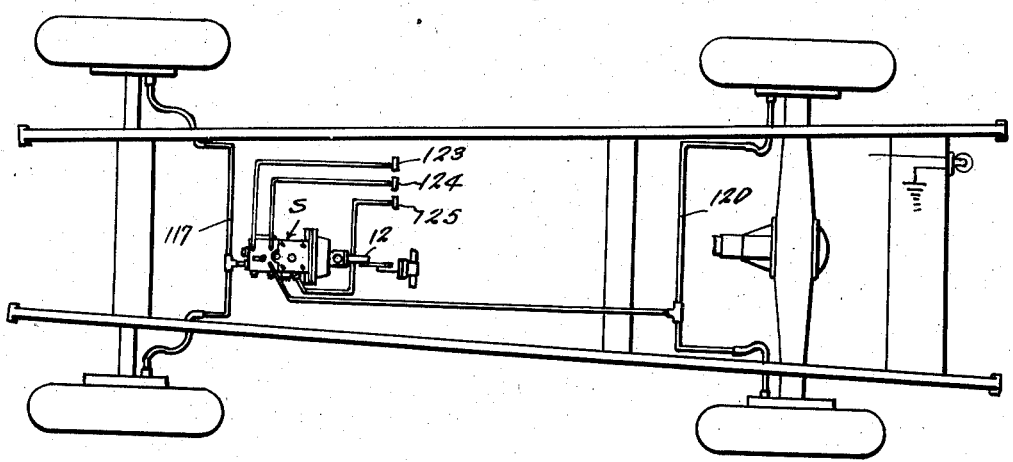
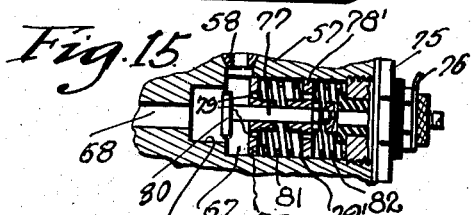
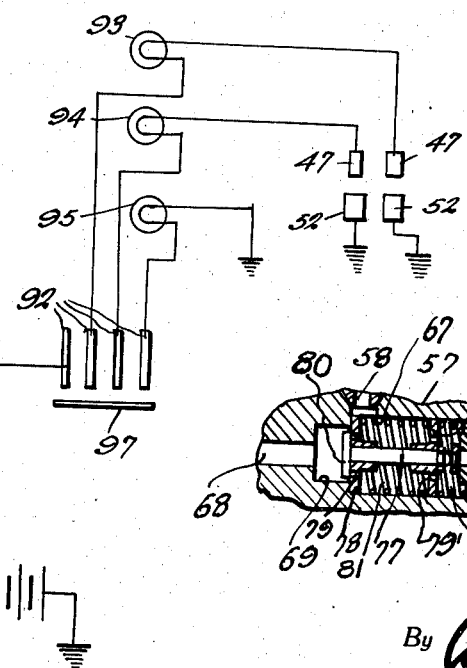
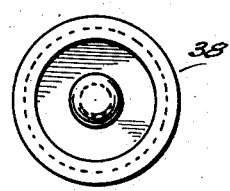
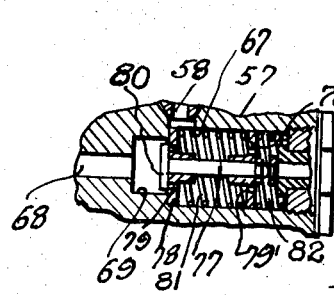
Inventor
Emil Hess
By Clarence A. O'Brien
Attorney

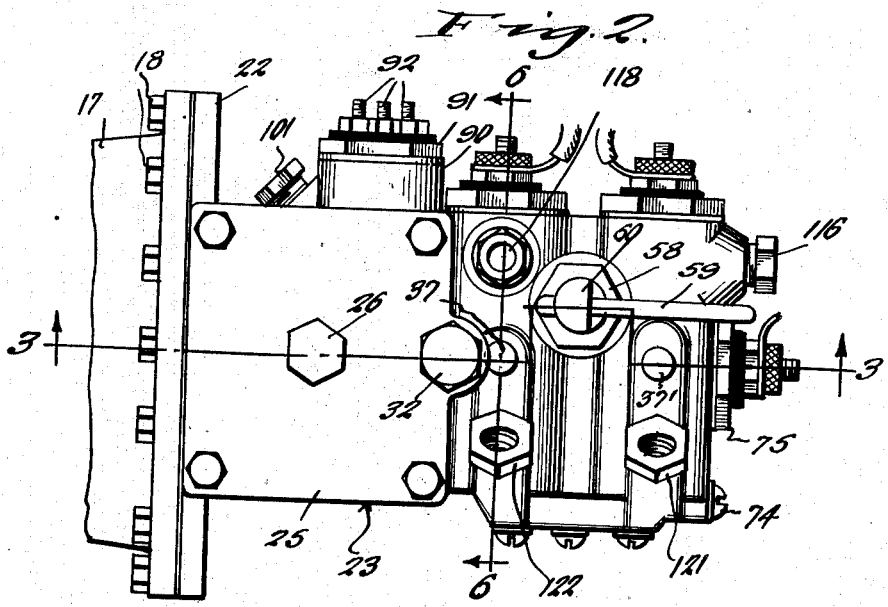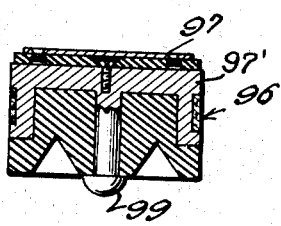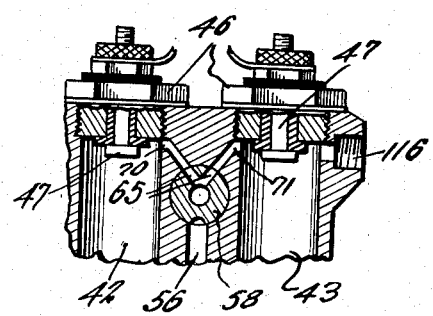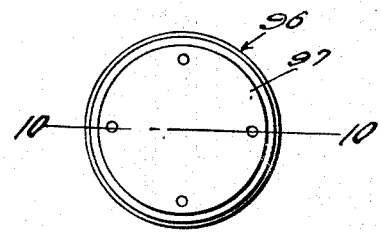

June 11, 1940.  E. HESS  2,203,908

SAFETY HYDRAULIC BRAKE SYSTEM

Filed Oct. 3, 1935  4 Sheets-Sheet 3

Inventor
Emil Hess
By Clarence A. O'Brien
Attorney

June 11, 1940.  E. HESS  2,203,908
SAFETY HYDRAULIC BRAKE SYSTEM
Filed Oct. 3, 1935  4 Sheets-Sheet 4
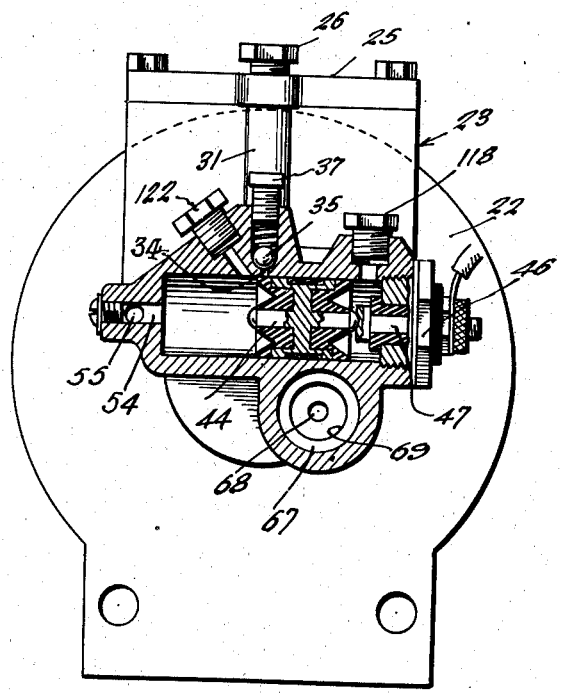
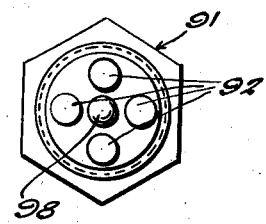
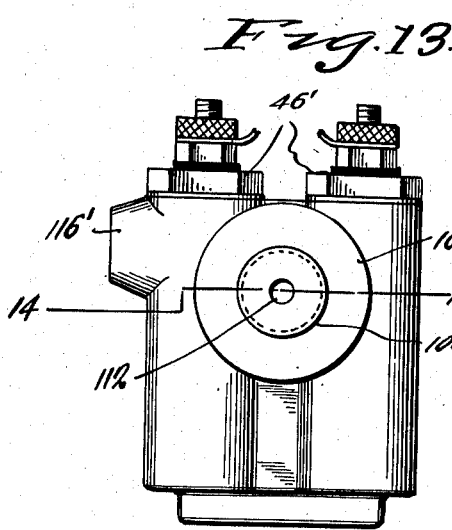
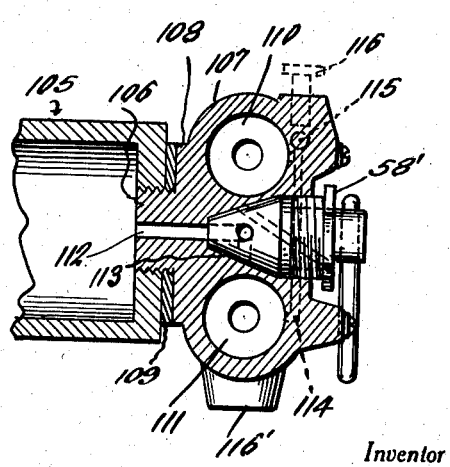
Inventor
Emil Hess
By Clarence A. O'Brien
Attorney Patented June 11, 1940

2,203,908

UNITED STATES PATENT OFFICE 2,203,908

SAFETY HYDRAULIC BRAKE SYSTEM

Emil Hess, Berlin, Wis.

Application October 3, 1935, Serial No. 43,439

3 Claims. (Cl. 188—152)

My invention relates generally to a safety hydraulic brake system for automobile vehicles, and particularly to a system of this character involving means arranged to operate to signal the operator of the vehicle in the event of an inoperative condition of either the front wheel brakes or the rear wheel brakes, and in which means is provided for automatically isolating in the system either the operative connections of the rear wheel brakes or the operative connections of the front wheel brakes, so that the one may function independently of and in the event of the incapacitation of the other, and an important object of my invention is to provide a simplified and mechanically efficient arrangement of this character, which does not disproportionately increase the cost of hydraulic systems.

Another important object of my invention is to provide means in a system of the character indicated hydraulic brake system master cylinder and to dicated which can be attached to an ordinary the front and rear brake operating tubing, whereby either the front or the rear hydraulic operative connections of the brakes may be maintained in operative condition despite the failure of the other.

Another important object of my invention is to provide means in a system of the character indicated which will operate automatically to keep the necessary amount of hydraulic fluid in operative relation to the operating parts despite small losses of fluid in service.

Another important object of my invention is to provide means in an arrangement of the character indicated above whereby excesses of fluid in portions of the system existent because of expansion due to heat and other causes may be automatically drained back into a reservoir portion of the system.

Another important object of my invention is to provide a triple function governer arrangement which is pressure responsive to control the distribution of fluid under pressure to different operative parts of the system, the same being operative to signal electrically a condition of lack of pressure while the vehicle is at a standstill.

Another important object of my invention is to provide means in a system of the character indicated above which is brought into operation by manual manipulation, whereby the system may be made operative to withdraw operating fluid from a reservoir portion and to inject the same into other operative portions for the purpose of replenishing the normal amount of fluid therein.

Other important objects of my invention will be apparent from a reading of the following description in connection with the drawings, wherein for purposes of illustration I have shown preferred embodiments of my invention.

In the drawings:

Figure 1 is a top plan view of an automobile chassis showing a safety hydraulic brake system in accordance with the present invention and applied thereto.

Figure 2 is a top plan view of the master cylinder assembly.

Figure 3 is a vertical longitudinal sectional view taken through Figure 2 approximately on the line 3—3 and looking upwardly.

Figure 4 is a horizontal sectional view taken through Figure 3 approximately on the line 4—4.

Figure 5 is a transverse vertical sectional view through the manual valve plug.

Figure 6 is a transverse vertical sectional view taken through Figure 2 approximately on the line 6—6 and looking toward the left in the direction of the arrows.

Figure 7 is a bottom plan view of the multi-contact plug with which the floating piston is arranged to engage.

Figure 8 is a horizontal sectional view similar to Figure 4 but showing the plug of Figure 5 in the abnormal position in which it is arranged when replenishing the fluid in the front and rear cylinders.

Figure 9 is a top plan view of the floating piston.

Figure 10 is a transverse vertical sectional view taken through Figure 9 approximately on the line 10—10.

Figure 11 is an end view of one of the metallic piston cores.

Figure 12 is a wiring diagram of the signalling system.

Figure 13 is an elevational view of the attachment for a conventional master cylinder whereby the front brakes are maintained operative in the event of a failure of the rear brakes, and vice versa.

Figure 14 is a sectional view taken through Figure 13 approximately on the line 14—14 showing the attachment connected to the conventional master cylinder.

Figure 15 is a vertical transverse sectional view through the governor mechanism showing the parts in the position which they occupy when the brakes are being applied by operation of the brake pedal, whereas Figure 3 shows the position of the parts upon the release of the brake pedal.

Figure 16 is a view similar to Figure 15 and shows the parts in the neutral positions which they occupy while they are maintaining the pressure in the fluid system to the brakes during early release of the master piston from the fully operated position and before the brake pedal has been completely released to allow the master piston to return to completely released position.

Referring in detail to the drawings, and particularly to Figure 3, the numeral 5 generally designates the master cylinder assembly which contains the master cylinder bore 6 in which works the master piston which is generally designated 7 which has a threaded shank 8 secured in a flanged coupling 9 between which and the end of the assembly operates a spiral expansion spring 10 which normally retracts the master piston to the fully released position shown in Figure 3. The coupling 9 is connected to a threaded shank 11 on the piston operating rod 12 and has also thereon a diaphragm 14 which is interposed between the flange of the coupling 9 and the nut 13. The diaphragm is flexible so as to move with the piston operating rod yet positively prevent the ingress of dirt into the piston mechanism. The piston rod 12 works through a packing gland 15 which is carried by the housing 17 and is lubricated by an oil cup 16. The housing 17 is bolted as indicated at 18 to the flange 19 which is in turn bolted as indicated at 20 to the supporting structure 21. The portion 22 of the flange 19 acts as one wall for the operating fluid reservoir which is located at one side of the assembly and is defined by the adjacent side of the master cylinder, two opposed side walls, and the wall 24, and is closed by a removable top plate 25 in which is located a vented filling plug 26. The interior of the reservoir is divided into compartments by horizontal and vertical baffle walls 27 each of which has a suitable opening 28 providing the necessary communication between the compartments while preventing the surging of the fluid in the reservoir which the walls are designed to overcome. Ports 29 and 30 lead into the side of master cylinder bore 6, the port 29 being located to be closed by the piston 7 in the retracted position of the piston with the port 30 uncovered and the port 30 being located so as to be closed in other positions of the piston and to be opened again only when the piston has returned to the fully retracted position, at which time the port 30 will be sufficiently open to admit the necessary amount of fluid into the cylinder bore in front of the piston. The purpose of the port 29 is to feed fluid from the reservoir as a lubricant to the packing in the piston groove 39 to prevent drying out of this packing.

In one portion of the front wall 24 of the reservoir is a transparent fluid gauge tube 31 whose upper end is closed by a plug 32 and whose lower end is in communication with the fluid passage 33 which opens into the reservoir and also communicates with the fluid passage 34 depending therefrom. The junction of these passages is normally closed by a check ball 35 held in place by a spring 36 adjustable as to tension by a screw 37.

The master piston 7, like all of the pistons employed in the present invention consists of a skeleton metal frame 38 having a peripheral groove 39 in which packing material is disposed, and on opposite ends of the frame are annuli 40 of rubber or similar material whose working face is provided with a V-shaped expansion groove 41.

Extending at right angles to the axis of the master cylinder and formed in the block on the front end of the assembly are the two brake operating cylinders 42 and 43, respectively, the cylinder 42 operating the rear wheel portion of the brake system, and the cylinder 43 operating the front wheel portion of the system. Since these cylinders and their pistons 44 and 45 are similarly arranged, only one will be described. One end of each cylinder is closed by a contact plug 46 which has axially arranged therein a contact 47 which is insulated from the plug as indicated by the numeral 48 and extends into the cylinder and outwardly of the plug, where the contact is provided with binding post nut 49 enabling the connection of the necessary conductor 50 which leads to the appropriate signal on the instrument panel or other convenient part of the automobile. This arrangement insulates the contact 47 from the chassis of the automobile to which the pistons 44 and 45 are grounded through their metallic contact with the walls of the corresponding cylinder by their skeleton frames at the point indicated by the numeral 51. The portions 51 are of a piece with the frame which includes the end contact knobs 52, one of which is arranged to make contact with the contact 47 in the extreme position indicated in Figure 4, which is the position assumed by the piston 45 when that portion of the brake system which operates the four brakes has become exhausted of the necessary amount of fluid, which exhaust is signaled by the contact made. The end of each cylinder opposite its contact plug is closed except for the passages 53 and 54 which lead into a common passage 55 which is in communication with the main passage 56 which leads between these cylinders into the tapered bore 57 in which the manually adjustable plug 58 works.

The control plug as shown in Figure 5 is traversed at its upper end by a manual lever 59 which engages through the opening 60 in the eccentric upper end of the plug. A vent 61 traverses the plug diagonally and opens at one side of the said upper end and at a point below the shoulder 62 which is engaged by the lower end of the retaining collar 63 which is threaded into the upper part of the bore to retain the plug in place. The plug has in its tapered part a transverse passage 64 having a lateral branch 65 opening through the side of the plug, and a main feed conduit 66 which is axially arranged and opens through the bottom of the plug into the pressure control chamber 67 which is located on an axis displaced from but parallel to the axis of the main cylinder 6 and whose rear end communicates with the main cylinder 6 by means of the passage 68 which has an enlarged portion 69 opening directly into the chamber 67. The lateral branch 65 is forked as clearly shown in Figure 4 in order to be capable of establishing communication simultaneously between the main passage 66 and the two auxiliary passages 70 and 71 which open into the plug equipped ends of the cylinders 42 and 43 for the purpose of introducing replenishing fluid in front of the pistons 44 and 45, the position of the plug 58 then being that illustrated in Figure 8. The need for the replenishing referred to would arise in the event a leak has drained the portion of the system operatively connected thereto or reduced the amount of fluid therein below that normally required.

The depending passage 34 already referred to and the similar passage 34' are controlled by the respective check valves 35 and 35' which are similar in arrangement and capability of adjustment. The common passage 33 has an open front end which is closed by a screw plug 74. The common passage 33 is in communication with the main passage 56 which is in communication, by means of the plug passage 66 and the plug passage 64 with the interior of the two operating cylinders 42 and 43.

Operating within the chamber 67 is the governor mechanism. The front end of the chamber 67 is closed by an electrical contact plug 75 which is constructed substantially similar to the contact plugs 46 and has a signaling conductor 76 connected thereto.

The governor mechanism includes the plunger 77 which is composed of the opposed heads 78 and 78' which fit in and slide in the enlarged portion of the chamber 67. The heads 78 and 78' are in the form of flanged collars, the flange portion having fluid passing openings 79 and 79', respectively, and the heads being reversed with respect to each other. The collar of the head 78 slides on the plunger rod which has the head 80 which is located in the chamber portion 69.

When fluid pressure is exerted by operation of the brake pedal and comes forward through the passage 68, the head 78 is moved from the position shown in Figure 3 wherein the head 78 abuts the shoulder defined at the forward end of the chamber 67 by the reduced chamber portion 69 to the position shown in Figure 15, wherein the head 78 is spaced from the said shoulder and from the element 80. In the position of the head 78 shown in Figure 16 it abuts the plunger head 80 and holds the same in the mouth of the reduced chamber portion 69 and over the holes 79 in the head 78 so as to close the same. In this position of the head 78 the plunger rod is withdrawn out of contact with the contact of the contact head 75 as clearly indicated in Figure 16. The head 78' is held in a rearwardly spaced position relative to the head 78 by that portion of the helical spring 81 which lies between these heads. The head 78' is normally spaced from the contact on the contact plug 75 by that portion of the spring 81 which lies between the head 78' and the plug 75, until an extreme pressure is exerted upon the heads 78 and 78', sufficient to move both of them and the element 80 away from the chamber 69 and toward the plug 75, whereupon the adjacent end of the rod of the plunger 77 will make contact with the contact of the plug 75.

With the parts in the neutral position shown in Figure 16 the head 78 closes off the communication between the passage 68 and the passage 58, and the fluid pressure in the brake system is thereby maintained in status quo, because the fluid cannot return from the brakes through the passage 58.

Upon full release of the brake pedal, a reduction in pressure takes place on the head 78' which permits the head 78' to move toward the left and the head 80 to move into the reduced chamber portion 69, so that fluid is permitted to pass from the passage 68 through the holes 79 in the head 78 and into the chamber 67 as well as into the passage 58.

When the brakes are applied with the parts in the positions shown in Figure 16, the head 78 moves in a right hand direction as indicated in Figure 15, and the spring 81 and the spring 82 are thereby compressed. The spring 81 compresses at the lower pressure so as to contact immediately the contact plug 75.

By means of the arrangement of the mechanism stated, the brakes may be held applied after pressure on the brake pedal has been reduced or partially released, by releasing the brake pedal to an intermediate position, whereat the spring 81 acts to imprison the fluid in the brake lines in conjunction with the support thereto afforded by the intermediate position of the master cylinder piston. Of course, upon complete release of the brake pedal and consequent retreat of the master cylinder piston, such a reduction in support to the spring 81 takes place that the spring 81 can no longer imprison the fluid in the brake lines, but permits the same to return from the brake lines and release the brakes.

By means of this arrangement, upon release of the brake pedal the pressure exerted is released as the piston in the master cylinder moves backwardly so as to suck the fluid along backwardly through the system.

Mounted in a tubular neck 90 projecting from one side of the master cylinder is the contact plug 91 which contains four equally circumferentially spaced contacts 92 which are insulated from the neck and from each other and are individually connected to the battery side of the signal circuit and to corresponding ones of the signals 93, 94, 95, as shown in Figure 12. A floating piston 96 works in the neck 90 and has on its upper end a metallic plate 97 which is arranged to engage the inner ends of and bridge all four of the contacts 92 when operating pressure has been developed within the master cylinder 6. The piston 96 is normally kept out of contact with the contacts mentioned by means of a compressible rubber bumper 98 which projects from the inner ends of the plug 91. Upon development of sufficient pressure within the cylinder the piston 96 is thereby pressed with sufficient force against the rubber bumper 98 to compress it and engage the contact plate 97 with the inner ends of 92. The plate 97 is grounded to the chassis of the automobile by connection with the metallic portion 92' of the floating piston 96 which engages the wall of the neck 90. The contacts 92 require to be bridged by the plate 97 in order to place the signal system in condition to be operated by the closing of the operating piston contact arrangement already pointed out. The floating piston 96 normally rests its metallic knob 99 on the lower side of a passage 100 one end of which opens into the side of the master cylinder, its opposite end being closed by a plug 101, as clearly shown in Figure 4.

When the master piston is operated by operation of the brake pedal, the fluid in the master cylinder is compressed and forced through the passage 68 into the governor mechanism chamber 69 whence the fluid passes into the main passage or duct 56 and then into the common passage 55 and into one end of the cylinders 42 and 43 in such a way as to push the pistons therein toward the plug equipped ends of their cylinders. When the tubing to which these cylinders are operatively connected are adequately full of operating fluid, the pistons will never reach positions in which they may contact with the contact plugs 46; but if the fluid in the operating tubes has been dissipated to an undesirable extent, the pressure placed on the pistons by the master piston will be greater than the back pressure in the system and sufficient to move these pistons to contact the contact plugs 46, and thereby close circuits to actuate the instrument panel signals when the brake pedal is depressed, and thereby warn the operator of the vehicle.

It is to be noted that when the piston 44 is in the fully retracted floating position in the cylinder 42 as shown in Figure 4 the bleeding passage 33 is uncovered so that any excess of fluid in front of the piston 44 may push by the check ball 35 and return to the reservoir 23.

Should a condition obtain in which the operating tubing connected to only one of the operating cylinders leaked, and a collapsing movement of the corresponding piston into the position shown in Figure 4 in the case of the piston 45, takes place, the other brake operating cylinder 42 would still be fully operative so as to maintain its tubing properly under pressure, because the fluid under the pressure from the master cylinder, while stopped by the piston 45 in the collapsed position shown in Figure 4, would still be completely operative with respect to the piston 44. In this way failure in either the front brake operating mechanism or in the rear brake operating mechanism cannot affect operation of the other mechanism.

Referring to Figures 13 and 14, there is shown an attachment for an ordinary master cylinder 105 such as is used in conventional hydraulic braking systems, whereby this conventional master cylinder is converted into one which is operative to fully operate either or both the front wheel operating portion or the rear wheel operating portion of a conventional hydraulic braking system. In this arrangement there is provided instead of the usual coupling connection between the tubing and the master cylinder 105, a nipple 106 which is threaded into the cylinder, the nipple being formed on a block 107 which has the shoulder 108 between which and the end of the cylinder is arranged a compressible washer 109 which prevents any leaks.

The block 107 contains two brake operating cylinders 110 and 111 which are connected to separated rear brake operating and front brake operating portions of the brake system tubing as pointed out in Figure 1 in connection with the first described embodiment of the present invention. The threaded neck 106 has an axial main passage 112 which leads from the master cylinder into the tapered bore 113 in which the control plug 58' operates. The control plug 58' is similar in all respects to the control plug 58 already described in connection with the first mentioned embodiment. Passage means establishing communication between the cylinders 110 and 111 and the passage 112 similar to that provided in conjunction with the cylinders 42 and 43 of the first described embodiment is provided in this embodiment and arranged under the control of the plug 58', and the cylinders are individually connected to the front and rear brake operating portions of the hydraulic tubing. A return bleed passage 114 is under the control of an adjustable check valve 115 having the adjusting screw 116, so as to operate similarly to the check valves 35 and 35' already described in connection with the first mentioned embodiment of this invention.

The open ends of the cylinders 110 and 111 are closed by contact plugs 46' to be electrically engaged by the pistons in the cylinders 110 and 111 for the purpose of operating signals of the type already mentioned.

Outlet fittings 116 in the case of the first embodiment and 116' in the case of the second embodiment of the invention connect with the front brake operating cylinder 43 for connecting the front brake operating portion 117 of the tubing system, while another fitting 118 in the case of the first embodiment and 118' in the case of the second embodiment affords connection with the rear brake portion 120 of the hydraulic tubing system.

The first described embodiment has in addition to these fittings, second fittings 121 and 122 for accommodating pressure indicating gauges 123 and 124 conveniently mounted on the automobile. The closure plug 101 of the master cylinder passage 100 likewise forms a connection for a pressure gauge 125 similarly mounted at the convenience of the operator of the vehicle, so that a constant visible check may be maintained on the relative pressures produced by operation of the brake pedal.

Although I have shown and described herein preferred embodiments of my invention, it is to be definitely understood that I do not desire to limit the application of the invention thereto, and any change or changes may be made in the materials, and in the structure and arrangement of the parts, within the spirit of the invention and the scope of the subjoined claims.

What I claim is:

1. In a fluid brake system for a motor vehicle, in combination a plurality of cylinders including a master cylinder having a piston working therein and a reservoir communicating therewith, secondary cylinders, floating pistons in said secondary cylinders, a passageway leading from said master cylinder, a governor cylinder into which said passageway leads, a triple function pressure equalizing piston in said governor cylinder for equalizing the distribution of fluid pressure to said secondary cylinders through passage means provided between said passageway and said secondary cylinders, said pressure equalizing piston being provided with spring means adjustable as to tension responsive to the desired fluid pressure in said system at the brake side of said piston, one end of said governor cylinder having an opening closed by a plug containing insulated contact post therein, a contact on said pressure equalizing piston arranged to engage said post in case of lack of normal fluid pressure in the system at the said brake side of the piston while the vehicle is at a standstill and an electrical signal operated by engagement of said contact and said post.

2. In a fluid brake system, a master cylinder including a piston operating therein, secondary cylinders adapted for connection to corresponding brake operating cylinders of the brake system, passage means establishing communication between the master cylinder and the secondary cylinders, said passage means including a pressure equalizing chamber, a pressure equalizing piston operating in said chamber and normally blocking communication between said passage and the said secondary cylinders, said pressure equalizing piston being arranged to be operated by fluid pressure generated by said master piston upon partial operation of the master piston to move to a retracted position and thereby permit communication between the corresponding secondary cylinder and said passage means upon full operation of the master piston.

3. In a fluid brake system, a master cylinder including a piston operating therein, secondary cylinders including pistons, said secondary cylinders being arranged for connection with the individual brake operating cylinders of the brake system, passage means establishing communication between the master cylinder and the secondary cylinders, said passage means including a pressure equalizing chamber, a pressure equalizing piston operating in said chamber and normally blocking communication between said passage and the said secondary cylinders, said pressure equalizing piston being responsive upon operation of the master cylinder piston to move to a retracted position establishing communication between said secondary cylinders and said passage means and to return to initial position to hold the fluid in said secondary cylinders and thereby keep the brakes applied upon a partial releasing of the master piston.

EMIL HESS.